United States Patent
Wang et al.

(10) Patent No.: US 9,653,914 B2
(45) Date of Patent: May 16, 2017

(54) INTERFACE SUPPLY SYSTEM

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Zhen-Sheng Wang, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 141 days.

(21) Appl. No.: 14/682,529

(22) Filed: Apr. 9, 2015

(65) Prior Publication Data

US 2016/0156172 A1    Jun. 2, 2016

(30) Foreign Application Priority Data

Dec. 2, 2014   (CN) .......................... 2014 1 0716642

(51) Int. Cl.
| H02H 3/00 | (2006.01) |
| H02H 9/02 | (2006.01) |
| H02H 3/08 | (2006.01) |
| H02H 3/26 | (2006.01) |
| H02J 7/04 | (2006.01) |
| H02H 3/20 | (2006.01) |

(52) U.S. Cl.
CPC .............. *H02H 9/025* (2013.01); *H02H 3/08* (2013.01); *H02H 3/20* (2013.01); *H02H 3/26* (2013.01); *H02J 7/045* (2013.01)

(58) Field of Classification Search
USPC ................................................ 361/18, 86–87
See application file for complete search history.

(56) References Cited

U.S. PATENT DOCUMENTS

2010/0287399 A1* 11/2010 Yasuda .................... G06F 1/28
                                                                    713/340

* cited by examiner

*Primary Examiner* — Danny Nguyen
(74) *Attorney, Agent, or Firm* — Steven Reiss

(57) ABSTRACT

An interface supply system includes a switching power supply, a control chip, and a control circuit. The control circuit is coupled to the switching power supply and the control chip. The switching power supply is configured to supply power to an interface. The control circuit is configured to be switched on and output a detection signal to the control chip when the switching power supply and the control chip are shorted. The control chip is configured to not supply power to the interface after receiving the detection signal.

20 Claims, 2 Drawing Sheets

INTERFACE SUPPLY SYSTEM

CROSS-REFERENCE TO RELATED APPLICATIONS

This application claims priority to Chinese Patent Application No. 201410716642.1 filed on Dec. 2, 2014, the contents of which are incorporated by reference herein.

FIELD

The subject matter herein generally relates to protection systems.

BACKGROUND

An interface supply system may be used to protect a circuit when shorted.

BRIEF DESCRIPTION OF THE DRAWINGS

Implementations of the present technology will now be described, by way of example only, with reference to the attached figures.

DETAILED DESCRIPTION

Figure 1:
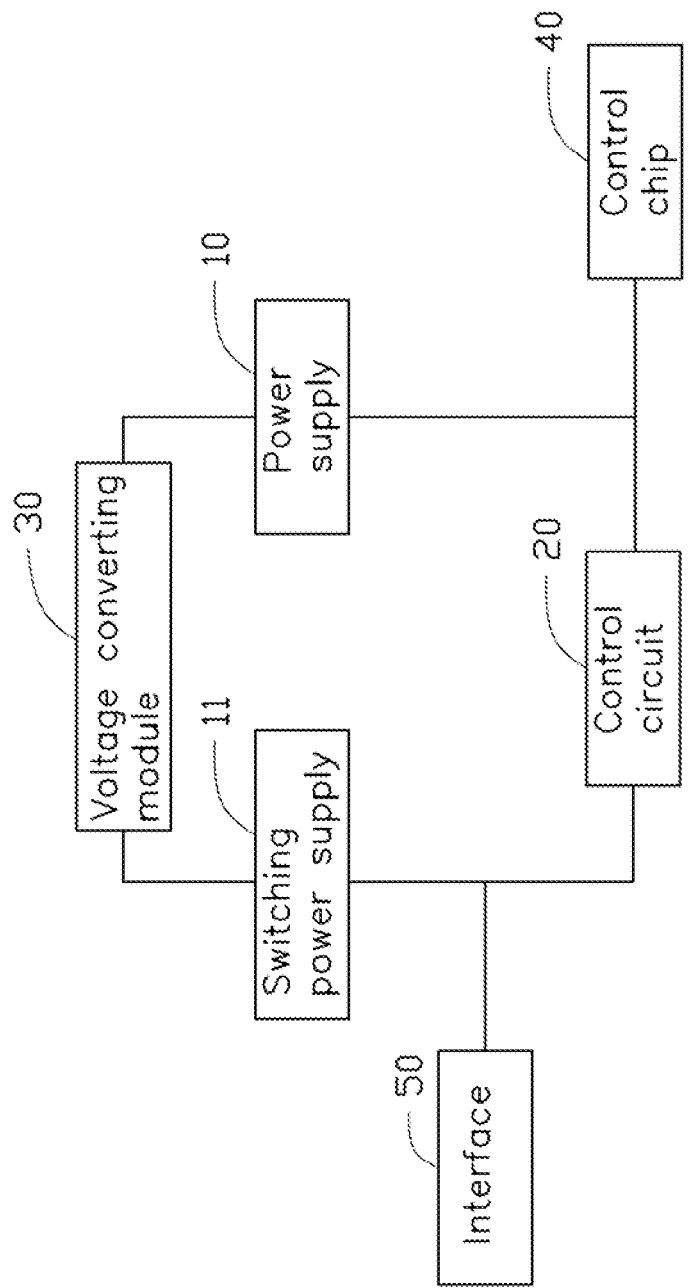
FIG. 1 is a block diagram of one embodiment of an interface supply system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present disclosure is described in relation to an interface supply system configured to protect a circuit when receiving overcurrent.

FIG. 1 illustrates an embodiment of an interface supply system. The interface supply system comprises a power supply 10, a control circuit 20, a voltage converting module 30, and a control chip 40. In at least one embodiment, the power supply 10 is configured to provide a 12V first voltage, the voltage converting module 30 is a voltage convertor and is configured to convert the power supply 10 to a switching power supply 11, the switching power supply 11 is configured to provide a 5V second voltage to supply power to an interface 50, the interface 50 is a USB interface, and the control chip 40 is a PCH chip and comprises a detection terminal OC.

Figure 2:
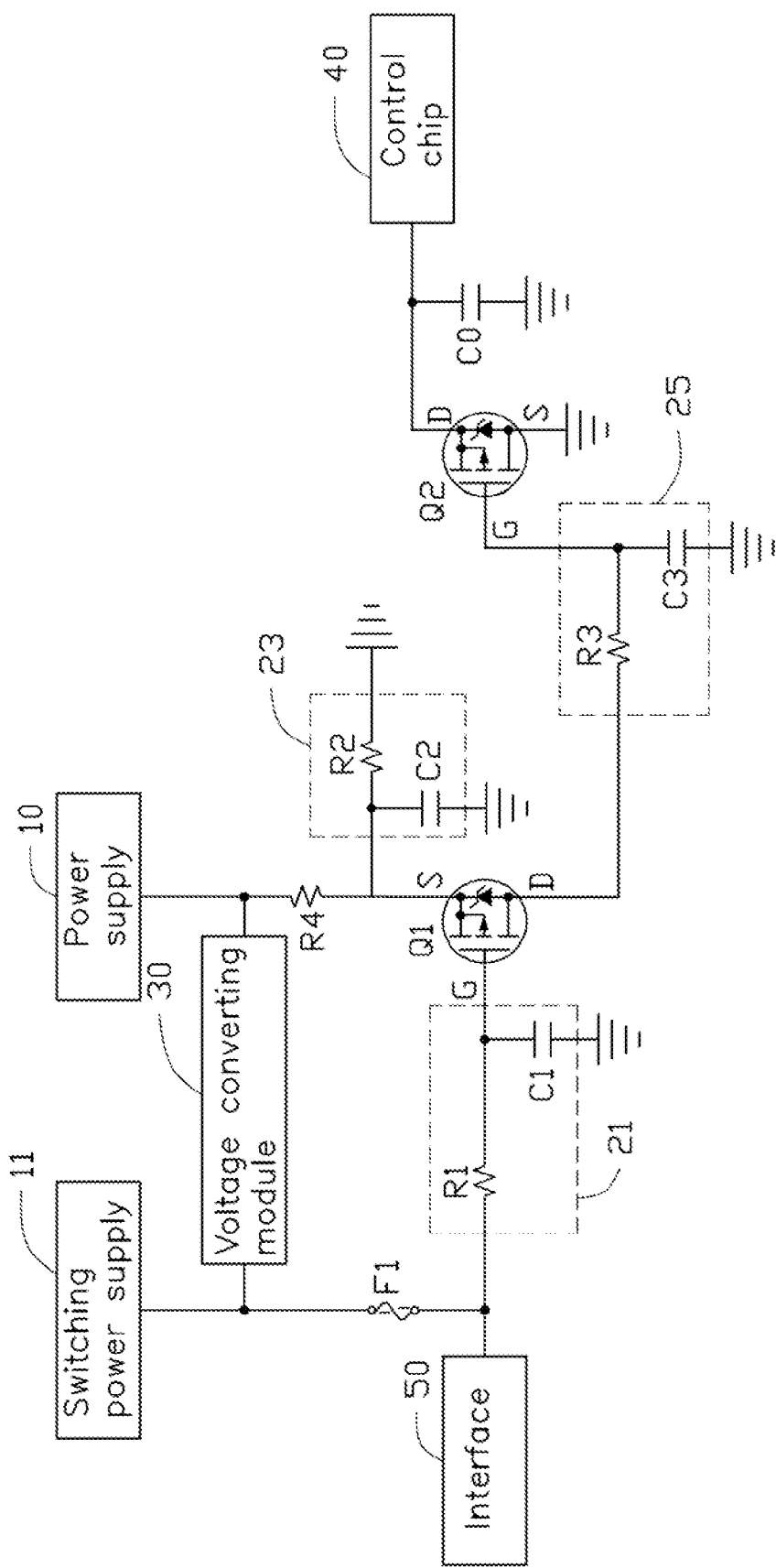
FIG. 2 is a circuit diagram of the interface supply system of FIG. 1.

FIG. 2 illustrates that the control circuit 20 comprises a first field effect transistor (FET) Q1, a first FET Q2, a first delay circuit 21, a second delay circuit 23, a third delay circuit 25, and a filter capacitor C0. Each of the first FET Q1 and the first FET Q2 comprises a control terminal G, a first connecting terminal S, and a second connecting terminal D.

In at least one embodiment, the first FET Q1 is a n-channel FET, the second FET Q2 is a p-channel FET, each control terminal G is a gate terminal G, each first connecting terminal S is a source terminal S, and each second connecting terminal D is a drain terminal D.

In at least one embodiment, each of the first delay circuit 21 and the second delay circuit 23 is a RC circuit. The first delay circuit 21 comprises a first resistor R1 and a first capacitor C1. The second delay circuit 23 comprises a second resistor R2 and a second capacitor C2. The third delay circuit 25 comprises a third resistor R3 and a third capacitor C3.

The power supply 10 is coupled to an input terminal of the voltage converting module 30. An output terminal of the voltage converting module 30 is coupled to one end of a fuse F1, the other end of the fuse F1 is coupled to one end of the first resistor R1 and is coupled to the interface 50. The other end of the first resistor R1 is grounded via the first capacitor C1 and is coupled to the gate terminal G of the first FET Q1. The power supply 10 is coupled to the source terminal S of the first FET Q1 via a fourth resistor R4. The source terminal S of the first FET Q1 is grounded via the second resistor R2 and grounded via the second capacitor C2. The drain terminal D of the first FET Q1 is coupled to one end of the third resistor R3. The other end of the third resistor R3 is grounded via the third capacitor C3 and is coupled to the gate terminal G of the second FET Q2. The source terminal S of the second FET Q2 is grounded. The drain terminal D of the second FET Q2 is grounded via the filter capacitor C0. The drain terminal D of the second FET Q2 is coupled to the detection terminal OC of the control chip 40.

A working principle of the interface supply system is as follows. When the switching power supply 11 supplies power to the interface 50 normally, the gate terminal G of the first FET Q1 receives a 5V voltage. The power supply 10 is converted to a 3.3V third voltage and is sent to the source terminal S of the first FET Q1 via the fourth resistor R4. The first FET Q1 is switched off, thereby enabling the second FET Q2 to be switched off. The switching power supply 11 cannot supply power to the interface 50 when receiving a short, thereby enabling the gate terminal G of the first FET Q1 to receive a 0V voltage. The source terminal S of the first FET Q1 receives the 3.3V third voltage. The first FET Q1 is switched on, thereby enabling the second FET Q2 to be switched on and output a low detection signal to the control chip 40. The control chip 40 determines overcurrent is contained in the interface 50 after receiving the detection signal and the interface 50 is disconnected from the control chip 40.

In the interface supply system, when a short is caused between the switching power supply 11 and the interface 50, the control circuit 20 is switched on and the low detection signal is output to the control chip 40, thereby enabling the interface 50 to disconnect from the control chip 40, thus protecting the circuit.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. An interface supply system comprising:
   a switching power supply;
   a control chip; and
   a control circuit coupled to the switching power supply and the control chip;
   wherein the switching power supply is configured to supply power to an interface;
   wherein the control circuit comprises a first field effect transistor (FET);
   wherein the first FET is coupled to the switching power supply and the interface;
   wherein the first FET is configured to output a detection signal to the control chip when a short is caused between the switching power supply and the control circuit; and
   wherein the control chip is configured to not supply power to the interface upon receiving the detection signal.

2. The interface supply system of claim 1, wherein the first FET is coupled to the switching power supply and the interface via a resistor, the first FET is switched on when the short is caused between the switching power supply and the control circuit, and the first FET outputs the detection signal to the control chip after being switched on.

3. The interface supply system of claim 1, wherein the control circuit further comprises a second FET coupled to the first FET, the second FET is further coupled to the switching power supply, the second FET is switched on when the short is caused between the switching power supply and the control circuit, and the first FET is switched on when the second FET is switched on.

4. The interface supply system of claim 3, wherein the control circuit further comprises a first delay circuit coupled between the first FET and the second FET.

5. The interface supply system of claim 4, wherein the first delay circuit comprises a first resistor and a first capacitor, each of the first FET and the second FET comprises a control terminal, a first connecting terminal, and a second connecting terminal, the first resistor is coupled between the control terminal of the first FET and the first connecting terminal of the second FET, one end of the capacitor is grounded, and the other end of the capacitor is coupled to the control terminal of the first FET.

6. The interface supply system of claim 5, wherein the control circuit further comprises a second delay circuit, the second delay circuit comprises a second resistor and a second capacitor, the second resistor is coupled between the source terminal of the first FET and ground, and the second capacitor is coupled between the source terminal of first FET and ground.

7. The interface supply system of claim 6, wherein the control circuit further comprises a third delay circuit, the third delay circuit comprises a third resistor and a third capacitor, the third resistor is coupled between the control terminal of the first FET and the switching power supply, and the second capacitor is coupled between the control terminal of the first FET and ground.

8. The interface supply system of claim 5, further comprises a power supply, wherein the power supply is configured to be converted to the switching power supply, the power supply is configured to provide a first voltage, the control circuit further comprises a fourth resistor, the fourth resistor is coupled to between the power supply and the second connecting terminal of the second FET, the first voltage is converted to a second voltage to send to the second connecting terminal of the second FET via the third resistor.

9. The interface supply system of claim 8, wherein the switching power supply is configured to provide a third voltage and the third voltage is greater than the second voltage.

10. The interface supply system of claim 9, wherein the second FET is a p-channel FET, the second FET is switched on when the short trouble is present between the switching power supply and the interface.

11. An interface supply system comprising:
    a power supply;
    a voltage converting module configured to convert the power supply to a switching power supply;
    a control chip; and
    a control circuit coupled to the switching power supply and the control chip;
    wherein the switching power supply is configured to supply power to an interface;
    wherein the control circuit comprises a first field effect transistor (FET);
    wherein the first FET is coupled to the switching power supply and the interface;
    wherein the first FET is configured to output a detection signal to the control chip when a short is caused between the switching power supply and the control circuit; and
    wherein the control chip is configured to not supply power to the interface upon receiving the detection signal.

12. The interface supply system of claim 11, wherein the first FET is coupled to the switching power supply and the interface via a resistor, the first FET is switched on when the short is caused between the switching power supply and the control circuit, and the first FET outputs the detection signal to the control chip after being switched on.

13. The interface supply system of claim 11, wherein the control circuit further comprises a second FET coupled to the first FET, the second FET is further coupled between the switching power supply and the power supply, the second FET is switched on when the short is caused between the switching power supply and the control circuit, and the first FET is switched on when the second FET is switched on.

14. The interface supply system of claim 13, wherein the control circuit further comprises a first delay circuit coupled between the first FET and the second FET.

15. The interface supply system of claim 14, wherein the first delay circuit is a RC circuit, the first delay circuit comprises a first resistor and a first capacitor, each of the first FET and the second FET comprises a control terminal, a first connecting terminal, and a second connecting terminal, the first resistor is coupled between the control terminal of the first FET and the first connecting terminal of the second FET, one end of the capacitor is grounded, and the other end of the capacitor is coupled to the control terminal of the first FET.

16. The interface supply system of claim 15, wherein the control circuit further comprises a second delay circuit, the second delay circuit comprises a second resistor and a second capacitor, the second resistor is coupled between the source terminal of the first FET and ground, and the second capacitor is coupled between the source terminal of first FET and ground.

17. The interface supply system of claim 16, wherein the control circuit further comprises a third delay circuit, the third delay circuit comprises a third resistor and a third capacitor, the third resistor is coupled between the control terminal of the first FET and the switching power supply, and the second capacitor is coupled between the control terminal of the first FET and ground.

18. The interface supply system of claim 15, wherein the power supply is configured to provide a first voltage, the control circuit further comprises a fourth resistor, the fourth resistor is coupled to between the power supply and the second connecting terminal of the second FET, the first voltage is converted to a second voltage to send to the second connecting terminal of the second FET via the third resistor.

19. The interface supply system of claim 18, wherein the switching power supply is configured to provide a third voltage and the third voltage is greater than the second voltage.

20. The supply circuit of claim 19, wherein the second FET is a p-channel FET, the second FET is switched on when the short is present between the switching power supply and the interface.

* * * * *